Patented Jan. 25, 1938

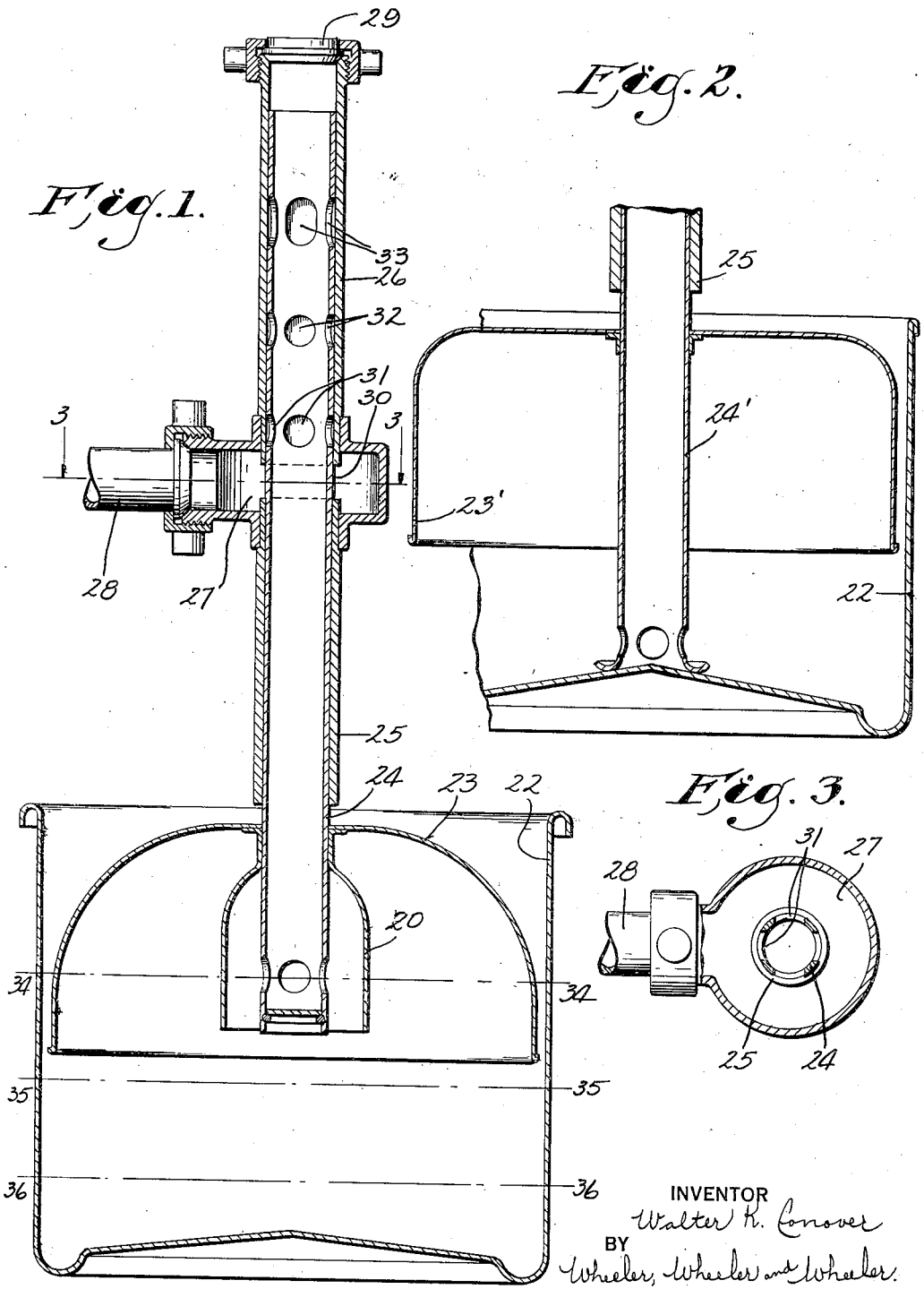

2,106,340

UNITED STATES PATENT OFFICE 2,106,340

VALVE

Walter K. Conover, New Castle, Pa., assignor to Cherry-Burrell Corporation, Chicago, Ill., a corporation Application July 31, 1936, Serial No. 93,562

6 Claims. (Cl. 137—68)

This invention pertains to valves.

It is an object of the invention to provide a valve operable in each of several different positions with respect to a port and useful, for example, to maintain each of several fluid levels corresponding to the particular positions at which it may be adjusted.

In the drawing:

Figure 1 is a view in axial section through a valve embodying this invention.

Figure 2 is a view showing a slightly modified construction for use in which the tank controlled by the valve is bodily adjustable as to its level.

Figure 3 is a detail view taken in section in the plane indicated at 3—3 in Fig. 1.

Like parts are identified by the same reference characters throughout the several views.

The present invention contemplates the necessity of maintaining liquid at various different levels such as the lines 34, 35, or 36 of Fig. 1. The entire reservoir may be subject to vertical movement between several different positions as in the disclosure of Fig. 2. This arrangement is useful in the case of a bottle filler required to operate on bottles of several different heights. In this device the valve is so worked out that in any given position of adjustment of the reservoir 22 the float will maintain the liquid in a stated relation to the reservoir.

Assuming the reservoir to be fixed as in Fig. 1, the apparatus may be manually adjusted to maintain any one of several different levels of liquid with respect to the fixed reservoir.

The bell 23' in Fig. 2 and the bell 23 in Fig. 1, differ in form but operate identically in principle. Each serves as a float by trapping air when immersed in liquid.

In each instance the bell is mounted on a sleeve valve 24 or 24' which, in this instance, happens to be inside of the pipes 25 and 26 which serve as extensions of the supply chamber 27 to guide the valve with reference to the port represented at 30 by the space between the ends of pipes 25 and 26.

The liquid enters the chamber through pipe 28 which is provided with a conventional quickly detachable coupling. A similar coupling holds the closure 29 removably to the top of pipe 26.

The sleeve valve is provided at different levels with a series of ports 31, 32 and 33. The valve is shown closed in the position which corresponds to the liquid level in reservoir 22 indicated approximately by line 34—34. Obviously, if such level be lowered by depletion of the contents of the reservoir 22, the float 23 will fall downwardly and ultimately will bring port 31 into registry with port 30, thereby allowing liquid to flow from chamber 27 through the sleeve valve into reservoir 22 until the rise of the liquid level in the reservoir raises the float or bell 23 sufficiently to move the sleeve valve to the position in which it is illustrated in Fig. 1, thereby cutting off further flow of liquid.

It will be apparent that if reservoir 22 is moved abruptly downwardly from the position illustrated for a distance approximating the distance between the ports 31 and 32 or 32 and 33, the opening of the valve will be merely transitory in the abrupt movement of the float with the reservoir and the liquid therein contained. In the new position of the reservoir the valve will again be closed until its higher ports 32 or 33, as the case may be, assume the stated relationship to the stationary supply port 30.

Where the reservoir is moved bodily and it is desired to maintain a given liquid level in the reservoir, regardless of the particular height or elevation of the reservoir, I prefer to extend the sleeve as shown at 24' in Fig. 2 so that in its wide open position the sleeve will rest upon the bottom of the reservoir. Assuming that the reservoir has three definite predetermined positions corresponding to the different levels of the ports 31, 32, 33, it will be apparent that in each one of these positions the tube 24' will, by contact with the bottom of the reservoir, act as a gauge to determine which set of ports will be applicable. This is particularly useful in starting the apparatus with the reservoir empty. In starting the device shown in Fig. 1 with an empty reservoir, it will be necessary to support the float manually or otherwise, at approximately the desired level until the liquid reaches that approximate level, following which the operation of maintaining the desired level will be automatic.

In the device shown in Fig. 1 the liquid is discharged from sleeve 24 within the bell 23, and to protect a supply of air within the bell and to prevent such air from becoming entrained with the liquid, I may use a baffle 20 as disclosed in the companion application of Adolph J. Lippold entitled "Float valves". This is not necessary in the device shown in Fig. 2 because the point at which the liquid is discharged is well below the level of the bell 23'.

Although I have illustrated only one valve mechanism, innumerable other equivalent arrangements will readily suggest themselves to those skilled in the art. The float mechanism shown in Fig. 2 may be understood to be connected either to the specific valve structure of Fig. 1, or to any other arrangement within the scope of the appended claims in which a supply port and a series of valves, or a valve and a series of ports, have different ranges of movement in each of which they coact to control flow.

In my description of Fig. 1, I have referred to the space between sleeves 25 and 26 as comprising a port with which the imperforate portions of the valve member 24 coact when the openings 31, 32 and 33 of such member are moved out of registry with the port. I am aware, however, that the device may be conversely viewed, the stationary sleeve 26 being regarded as the valve element, and the apertures 31, 32 and 33 being regarded as movable ports with respect to which the single valve element 26 co-operates in the different ranges of relative movement above described.

I claim:

1. The combination with supply means providing a fixed port, of a sleeve having apertures at different levels for alternative registration with said port and having means adjacent the respective apertures for closing said port upon displacement of the respective apertures therefrom, and a float connected with said sleeve for the operation thereof, together with a receptacle arranged to receive liquid through said port upon registration of a sleeve aperture therewith and within which said float is operatively disposed.

2. In a valve, the combination with a supply means having a port, of a sleeve having different relative ranges of movement respecting said supply means and provided with at least one opening movable to and from registry with said port in each such range of relative movement, a float connected with said sleeve and a chamber in which said float is operable to maintain any of a plurality of different liquid levels.

3. In a valve, the combination with a supply chamber having a port, of a sliding valve member provided with means guiding it for reciprocation past said port, said member having at different points along its length valve means separately co-acting with said port for the control of flow therethrough, a reservoir, means for conducting to said reservoir the fluid through said port as controlled by said member, and a float in said reservoir connected with said member for the adjustment thereof to maintain any one of a series of liquid levels in said reservoir corresponding to the several valve means of said member.

4. An automatic valve for maintaining a constant liquid level in a reservoir which is movable to predetermined positions with respect to a liquid supply chamber, said valve comprising in combination a supply port, a member movable with respect to said port and provided at different points with separate valve means co-acting therewith, a float in such reservoir to partake of the movement of said reservoir and the liquid, if any therein contained, as said reservoir is adjusted, said float being operatively connected with said member, and means likewise connected with said member engageable with a portion of said reservoir and comprising a stop for limiting the movement of said member beyond the port opening position thereof in each of the several positions of the reservoir.

5. In a valve, the combination with a single valve member, of a complementary member provided with a series of ports with any of which said valve member is alternatively operable said valve member being adapted to cut off flow between said series of ports and in all circumstances except when in open position respecting a particular port, means guiding said members for relative movement, a receptacle positioned to receive the effluent through said ports and means controlled by the accumulation of such effluent to said receptacle for adjusting one of said members with respect to the other.

6. In a valve, the combination with a pair of relatively movable members, and means guiding said members for relative sliding movement, of valve means carried by one of said members, a plurality of valve means carried by the other, the valve means of the respective members being co-operable to control flow in any of a plurality of ranges of relative movement between said members, and means operatively connected to be subject to the material which has flowed past the co-operating valve means aforesaid for effecting relative movement between said members.

WALTER K. CONOVER.